Nov. 16, 1965     K. EBNER     3,218,133
APPARATUS FOR PRODUCING CRYSTALS FROM SOLUTIONS
Filed July 2, 1962
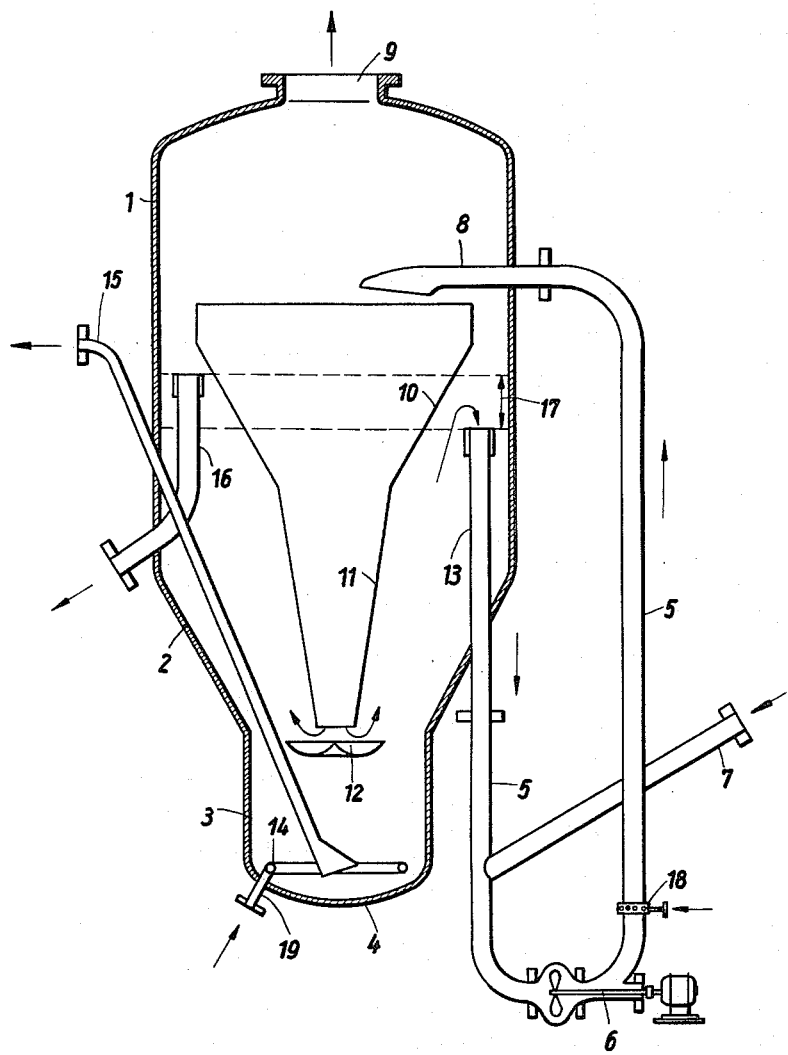
Inventor:
KARL EBNER
By Toulmin & Toulmin
Attorneys

United States Patent Office 3,218,133
Patented Nov. 16, 1965

3,218,133
APPARATUS FOR PRODUCING CRYSTALS
FROM SOLUTIONS
Karl Ebner, Oberursel, Taunus, Germany, assignor to Metallgesellschaft Aktiengesellschaft, Frankfurt am Main, Germany
Filed July 2, 1962, Ser. No. 206,641
Claims priority, application Germany, July 7, 1961, M 49,595; Mar. 2, 1962, M 51,987
4 Claims. (Cl. 23—273)

The present invention relates to producing coarse crystals from a solution, more particularly, to an apparatus for producing coarse crystals of a uniform size from a saturated solution under reduced pressure.

This application is a continuation-in-part of applicant's copending application Serial No. 736,618, now U.S. Patent No. 3,137,544.

Cooling a saturated solution of a crystallizable solid substance will produce crystals of various sizes depending upon the nature and speed of the cooling process. In order to produce large crystals the saturated solution is cooled to the range of the metastable saturation. In this range very few, if any, crystals will be formed which would provide nuclei for the formation of larger crystals and solid substances from the solution will be deposited on the crystals which have already been formed and which correspondingly increase in size.

This crystallization process can be carried out in a cylindrical vessel whose lower portion tapers inwardly to form a conical section as disclosed in applicant's copending application Serial No. 736,618, now U.S. Patent No. 3,137,544. The vessel comprises an evaporating zone and a crystallization zone with a circulating system to circulate the warm solution through these zones. A supply line is provided for introducing the warm solution into the vessel and a discharge line is used to withdraw the vapors produced by the evaporation of the solution and the crystals formed during the crystallization process.

The circulating system comprises a conduit with one end opening above a conical chamber co-axially mounted within the vessel and extending outwardly and downwardly of the vessel so the other end of the conduit is positioned in the vessel at substantially the level of the solution therein. An air supply line is connected to the conduit to stir the solution therein according to the principle of the air-lift agitator.

The lower open end of the conical chamber is positioned adjacent the bottom of the vessel and the upper open end of the conical chamber is in the vicinity of the level of solution in the vessel.

The solution discharged from one end of the circulating conduit into the upper end of the conical chamber is cooled by a partial evaporation which is so carried out that the decrease in temperature is within the range of the metastable saturation of the solution.

Additional solution is introduced into the circulating conduit to compensate for the solution which has been evaporated. The solution circulating through the conduit is about 2 to 3 times the quantity of the added compensating solution.

During the crystallization process the solution flows downwardly within the conical chamber and is discharged from the lower end thereof into an annular space formed between the chamber and the vessel. The solution flows into the crystallization zone located in the conical bottom of the vessel, wherein solid matter precipitates out of the solution and is deposited upon existing crystals which grow accordingly. The solution is then flowed from the crystallization zone either into the vaporization zone by adding new solution and correspondingly heating the solution or into a series-connected crystallization stage operated according to the same principle.

The speed of the solution rising in the annular space between the conical chamber and the wall of the vessel is less in the region of the conical bottom of the vessel. Thus, flow conditions are established in this annular space wherein the large crystals descend to the bottom of the vessel, but the smaller crystals whose descending speed is less than the speed of the rising solution, are maintained in suspension. These smaller crystals will then grow in size in the supersaturated solution until they have reached the size at which they will drop out of the solution. The crystals dropping out of the solution are then accumulated in the bottom of the vessel from which they are either periodically or continuously discharged through a valve mounted in the lower portion in the bottom of the vessel.

However, when the crystals are removed from the bottom of the vessel, some solution which is in the stage of a metastable saturation is simultaneously removed therewith. Crystal separations will then occur in the discharging structure which give rise to operating troubles.

The large-size crystals obtained according to this prior art process still contain a portion of medium-size, fine- and finest-size crystals which in many cases are undesired. Many attempts have been made to carry out this crystallization process so as to obtain a large crystal of a uniform size, but up to the present time such attempts have not proven entirely satisfactory.

It is therefore the principal object of the present invention to provide a novel and improved process and apparatus over that of application Serial No. 736,618, now Patent No. 3,137,544 for the production of large-size crystals of a uniform size from the saturated solution.

The crystallization process and apparatus of the prior art as described above is considerably improved by the present invention wherein the crystallization zone in the vessel is so located that a satisfactory accumulation of of the crystals obtained in the solution is possible. The vessel of the present invention comprises a lower cylindrical portion on the bottom of the conical portion of the vessel. The crystals accumulate in this cylindrical portion and a suitable gas is introduced in this cylindrical portion at such a rate that only the coarse-grain crystals remain accumulated and the finer grains are maintained in suspension in the solution. The end of the circulating conduit in the vicinity of the level of the solution is positioned below the level of the solution so that a settling zone is created between the level of the solution and the end of the circulating conduit. As a result the growth of the fine crystals is favored and the crystal sizes are classified with the coarse crystals being separated out at the bottom of the crystallization zone independently of the speed of the solution flowing through the annular space between the conical chamber and the vessel wall.

The solution flowing downwardly through the conical chamber is deflected upwardly into the zone of the conical annular space so that the flow of the solution does not reach the accumulated crystals. Accordingly, no supersaturation can result in the lower portion of the vessel where the crystals are accumulated.

The production of coarse crystals can be accelerated by heating the solution containing fine crystals as the solution is being circulated through the crystallization zone or being flowed to the next crystallizing stage. This is accomplished by injecting a vapor of the solution into the circulating solution so that the solution is heated about 0.1 to 0.2° C.

The present process also provides for heating the solution which is withdrawn together with the crystals from the vessel and then flowed into either a second stage or into another apparatus. This heating will eliminate any fine nuclei for crystals formed therein and is accomplished also by the injection of vapor of the solution into the solution.

Other objects and advantages of the present invention will be readily apparent upon reference to the accompanying description and the drawing which shows in section a vessel and the apparatus for carrying out the crystallization process according to the present invention.

The vessel has an upper cylindrical portion 1 to the lower end of which is integrally connected an intermediate conical portion 2 and a lower cylindrical portion 3, extending from the lower end of the intermediate portion. The upper cylindrical portion 1 comprises the evaporation chamber. The conical intermediate portion 2 comprises the crystallization zone and the lower cylindrical portion 3 with its bottom 4 comprises a collecting zone for the accumulating crystals. The top surface of the upper cylindrical portion 1 is provided with a flanged opening 9 to which is connected a vacuum and vapor conduit, which is not shown in the drawing.

A conical chamber having an upper portion 10 and a tapering lower portion 11 is co-axially positioned within the vessel. The upper end of the conical chamber is open and is positioned in the vaporization zone 1. The neck or tapering portion 11 of the conical chamber extends downwardly to the lowermost portion of the crystallization zone 2 and has its opening at substantially the interconnection between the intermediate conical portion 2 and the lowest cylindrical portion 3. A curved baffled plate 12 is positioned immediately below the lower opening of the conical chamber to deflect liquid flowing therethrough upwardly within the vessel. The baffle 12 is also co-axially positioned within the crystallization vessel.

A circulating conduit 5 has one end 13 thereof extending from the annular zone between the conical chamber and the wall of the vessel from a point below the level of the solution in the vessel. The circulating conduit extends downwardly through the wall of the crystallization zone 2 and then upwardly exteriorly of the vessel to have its other end 8 positioned above the upper open end of the conical chamber. A pump 6 of the propeller type is mounted in the lowermost portion of the circulating conduit 5.

A discharge tube 16 is mounted in the wall of the vessel so that one end is at the level of the solution within the vessel and the other end extends outwardly of the vessel to enable the solution to be discharged from the vessel, such as to a succeeding crystallizing stage.

An air distributing ring 14 is mounted in the lowermost region of the lower cylindrical portion 3 and is connected through conduit 19 to a source of air or to some other suitable gas which is being used. The distributing device 14 has a plurality of perforations therein to enable the air to be uniformly distributed throughout the lower cylindrical portion 3 in such a manner that the coarse crystals remain in the cylindrical portion 3 but the smaller crystals are blown upwardly to be suspended in the solution flowing upwardly within the vessel.

A conduit 15 extends through the wall of the vessel with its lower open end being positioned in the lowermost portion of the cylindrical portion 3. The upper end of the conduit 15 is connected to an air-lift pump (not shown in the drawing) whereby accumulated crystals may be sucked from the bottom 4 of the accumulation zone. The crystals may then be flowed to a centrifuge or a filter for removing any solution adhering to the crystals. If desired, these crystals may also be delivered to a subsequent crystallizing stage to serve as nuclei for the formation of crystals therein.

The bottom 4 of the vessel may also be provided with a discharge valve to permit the withdrawal of accumulated crystals therefrom.

In carrying out the process of the present invention, the vessel is placed under subatmospheric pressure so that the vapors resulting from the evaporation of the solution may be used in a manner to be later described. The vessel is filled with saturated solution to the level of the upper end of the discharge conduit 16.

The solution flowing upwardly from the crystallization zone 2 is withdrawn through the conduit 13 circulated through the circulating conduit 5 by means of the pump 6 and then discharged from conduit 8 into the evaporation zone. The solution discharged into the evaporation zone is partly evaporated and cooled when expanded in the vacuum existing in the vessel. By mixing this solution with the remaining solution in the conical chamber the total quantity of the solution is cooled and super-saturated to the metastable range.

The solution flowing downwardly within the conical chamber 10, 11 is deflected upwardly by the baffle 12 positioned in the crystallization zone. As the quantity of the liquid in the vessel decreases both through evaporation and by discharge through the conduit 16, compensating saturated solution is supplied into the circulating conduit 5 through conduit 7.

Since the solution within the conical chamber 10, 11 and in the crystallization zone 2 of the vessel is in a metastable state, crystal growth occurs primarily in these portions of the vessel and very few new crystal nuclei are formed in these portions of the vessel. In the upper enlarged portion of the crystallization zone 2 smaller crystals are maintained in suspension as the speed at which the solution flows upwardly therethrough decreases. The large-size crystals, however, are not maintained suspended by this decreasing flow of the solution and hence drop downwardly into the accumulation zone in the lower cylindrical portion 3. The air rising from distributor 14 will cause any small crystals which enter the accumulation zone to be driven therefrom into suspension into the solution. As a result virtually all of the crystals accumulating in this lowermost portion of the vessel will be uniform in size and will be large or coarse crystals. These large crystals are then withdrawn periodically or continuously through conduit 15 and the smaller crystals are maintained in suspension within the solution until their size increases sufficiently so that they are separated out and collected in the bottom of the vessel.

The difference in heights between the upper ends of the discharge conduit 16 and the withdrawal conduit 13 results in the formation of the settling zone in the solution between these two orifice openings.

Vapor from the evaporating solution is introduced at 18 into the circulating conduit 5 in order to heat the solution circulating therethrough by approximately 0.1 to 0.2° C. prior to introducing the solution into the evaporation zone from conduit 8. During the flow of the solution from 18 to discharging conduit 8, any small fine crystals in the solution will be eliminated by the warmer vapor. In this manner certain operating conditions will permit the elimination of the settling zone 17 and/or the accumulation zone 3 can be made smaller.

When the solution is being withdrawn from the vessel to be flowed into either a second stage or to other suitable apparatus, vapor may also be introduced into this solution so as to eliminate any fine crystals therein. It is noted that since in most cases the vapor produced during the expansion of the solution in the crystallizing vessel is employed for preheating purposes, the heat of the injected vapors is completely recovered when preheating the warmer stages of the crystallization process.

Thus it can be seen that the present invention provides a simple yet effective process and apparatus for producing large crystals of a uniform size from a saturated solution. The improved process and apparatus disclosed herein will enable the crystallization process to be carried out in such a manner that virtually all of the crystals withdrawn from the vessel will be uniform in size and will be of the desired coarseness.

*Example*

In a crystallizer having a diameter of about 1000 mm. and a height of 1600 mm. and maintained at a pressure of 0.058 atmosphere absolute, 300 liters of a potassium chloride solution having a saturation point of 95° C. and consisting of 200 g./l. KCl
    130 g./l. NaCl
    90 g./l. MgCl$_2$
    60 g./l. MgSO$_4$ was cooled from 95° C. to 45° C. In this testing apparatus the quantity of circulated liquid was such that a mixed temperature was obtained which was 3° C. higher than the temperature of the salt solution in the crystallizer. The solution circulating through the conduit was about 17 times the quantity of the added solution.

For purposes of heat economy, the plant had a plurality of such successive crystallizers in series, in this case 8, so that double the amount of stirred up liquid would be sufficient to work in a metastable temperature range of approximately 3° C.

In the testing crystallizer the obtained crystal grain had the following composition:

94% by weight for an average grain size of 0.75 mm.
1% by weight for an average grain size of 0.15 mm.
5% by weight for an average grain size of 0.06 mm.

When the circulated liquid was heated by 0.2° C. the 5% by weight crystals became smaller than 0.06 mm. because they were dissolved because of the heating.

It will be understood that this invention is susceptible to modification in order to adapt it to different usages and conditions, and, accordingly, it is desired to comprehend such modifications within this invention as may fall within the scope of the appended claims.

What is claimed is:

1. An apparatus for producing coarse crystals from a saturated solution under reduced pressure, and comprising a vessel having an upper cylindrical portion and a lower cylindrical portion of reduced diameter defining a collecting zone for accumulating crystals with a conical intermediate portion having an upper diameter connecting said upper cylindrical portion and a lower diameter connecting said lower cylindrical portion, a solution discharge conduit having one end defining the level of the solution in said upper cylindrical portion and extending downwardly through the wall of said vessel, means defining a funnel-shaped chamber having a larger open upper end and a smaller open lower end co-axially positioned in said vessel with said smaller open end thereof directed downwardly of said vessel, said upper end of said means extending above said one end defining the level of the solution in said upper cylindrical portion, a circulating conduit having one end above said larger open upper end of said means and extending outwardly of said vessel having another end at a point just below said one end defining the level of the solution, said one end of said discharge conduit being spaced above said another end of said circulating conduit defining therebetween a settling zone in the solution, a supply conduit connected to said circulating conduit, means in said lower cylindrical portion for discharging crystals accumulating therein, an upwardly curved baffle below said smaller end of said means and in the zone of said lower diameter connecting said lower cylindrical portion, and means in the lower area of said lower cylindrical portion for distributing air upwardly in said vessel.

2. An apparatus for producing coarse crystals from a saturated solution under reduced pressure, and comprising a vessel having an upper cylindrical portion and a lower cylindrical portion of reduced diameter defining a collecting zone for accumulating crystals with a conical intermediate portion having an upper diameter connecting said upper cylindrical portion and a lower diameter connecting said lower cylindrical portion, a solution discharge conduit having one end defining the level of the solution in said upper cylindrical portion and extending downwardly through the wall of said vessel, means defining a funnel-shaped chamber having a larger open upper end and a smaller open lower end co-axially positioned in said vessel with said smaller open end thereof directed downwardly of said vessel, said upper end of said means extending above said one end defining the level of the solution in said upper cylindrical portion, a circulating conduit having one end above said larger open upper end of said means and extending outwardly of said vessel having another end at a point just below said one end defining the level of the solution, a supply conduit connected to said circulating conduit, means in said lower cylindrical portion for discharging crystals accumulating therein, an upwardly curved baffle below said smaller end of said means and in the zone of the said lower diameter connecting said lower cylindrical portion, means in the lower area of said lower cylindrical portion for distributing air upwardly in said vessel, and means connected to said circulating conduit for introducing therein vapor from the solution.

3. An apparatus for producing coarse crystals from a saturated solution under reduced pressure, and comprising a vessel having an upper cylindrical portion and a lower cylindrical portion of reduced diameter defining a collecting zone for accumulating crystals with a conical intermediate portion having an upper diameter connecting said upper cylindrical portion and a lower diameter connecting said lower cylindrical portion, a solution discharge conduit having one end defining the level of the solution in said upper cylindrical portion and extending downwardly through the wall of said vessel, means defining a funnel-shaped chamber having a larger open upper end and a smaller open lower end co-axially positioned in said vessel with said smaller open end thereof directed downwardly of said vessel, said upper end of said means extending above said one end defining the level of the solution in said upper cylindrical portion, a circulating conduit having one end above said larger open upper end of said means and extending outwardly of said vessel having another end at a point just below said one end defining the level of the solution, pump means in said circulating conduit, a supply conduit connected to said circulating conduit, means in said lower cylindrical portion for discharging crystals accumulating therein, an upwardly curved baffle below said smaller end of said means and in the zone of said lower diameter connecting said lower cylindrical portion, and means in the lower area of said lower cylindrical portion for distributing air upwardly in said vessel.

4. An apparatus for producing coarse crystals from a saturated solution under reduced pressure and comprising a vessel having an upper cylindrical portion and a lower cylindrical portion of reduced diameter defining a collecting zone for accumulating crystals with a conical intermediate portion having an upper diameter connecting said upper cylindrical portion and a lower diameter connecting said lower cylindrical portion, a solution discharge conduit having one end defining the level of the solution in said upper cylindrical portion and extending downwardly through the wall of said vessel, means defining a funnel-shaped chamber having a larger open upper end and a smaller open lower end co-axially positioned in said vessel with said smaller open lower end thereof directed downwardly of said vessel, said upper end of said means extending above said one end defining the level of the solution in said upper cylindrical portion, a circulating conduit having one end above said larger open upper end of said means and extending outwardly of said vessel having another end at a point just below said one end defining the level of the solution, a supply conduit connected to said circulating conduit, means in said lower cylindrical portion for discharging crystals accumulating therein, an upwardly curved baffle below said smaller end of said means and in the zone of said lower diameter connecting said lower cylindrical portion, and means in the lower area of said lower cylindrical portion for distributing air upwardly in said vessel.

References Cited by the Examiner

UNITED STATES PATENTS

| | | | |
|---|---|---|---|
| 1,560,473 | 11/1925 | Howard | 23—273 |
| 1,810,217 | 6/1931 | Lohmann | 23—273 |
| 1,983,805 | 12/1934 | Munson et al. | 23—273 XR |
| 2,137,729 | 11/1938 | Schellenburg | 23—273 |
| 2,567,968 | 9/1951 | Saeman | 23—273 XR |
| 2,698,225 | 12/1954 | Svanoe | 23—301 |
| 2,931,712 | 4/1960 | Turobinski | 23—301 |
| 3,068,077 | 12/1962 | Witte | 23—273 |

FOREIGN PATENTS

| | | |
|---|---|---|
| 541,220 | 5/1957 | Canada. |
| 592,289 | 1/1934 | Germany. |
| 1,036,814 | 8/1958 | Germany. |

NORMAN YUDKOFF, *Primary Examiner.*